United States Patent [19]

Houghton

[11] 4,383,566
[45] May 17, 1983

[54] TIRES

[76] Inventor: Timothy J. Houghton, Royal Oak Farm, P.O. Box 167, CC942, Betws Y Coed Jeddah, North Wales, Saudi Arabia

[21] Appl. No.: 151,555

[22] Filed: May 20, 1980

Related U.S. Application Data

[63] Continuation-in-part of Ser. No. 966,243, Dec. 4, 1978, abandoned.

[51] Int. Cl.³ .............................................. B60C 17/00
[52] U.S. Cl. ............................... 152/158; 152/330 RF; 152/330 L; 428/314.4; 428/316.6
[58] Field of Search ........ 152/155, 157, 158, 310–313, 152/316, 320, 330 RF, 330 L, 342, 346–348; 428/65, 913, 188, 310, 315, 314.4, 316.6

[56] References Cited

U.S. PATENT DOCUMENTS

| | | | |
|---|---|---|---|
| 1,410,892 | 3/1922 | Costello | 152/313 X |
| 1,423,748 | 7/1922 | Berman | 152/312 |
| 3,022,810 | 2/1962 | Lambe | 152/157 |
| 3,426,821 | 2/1969 | Boileau | 152/158 |
| 3,485,283 | 12/1969 | Brehmer et al. | 152/158 |

FOREIGN PATENT DOCUMENTS 2008505  6/1979  United Kingdom .

Primary Examiner—William A. Powell
Assistant Examiner—Thomas Bokan
Attorney, Agent, or Firm—William A. Drucker

[57] ABSTRACT

The invention relates to a multistrip insert, usually comprising three strips side-by-side, for a pneumatic tire, said insert being composed at least in part of a closed cell resilient material constructed and dimensioned to fit ring-like about a wheel rim within the tire. The insert normally fills less than the whole internal cross-sectional volume of the tire but can support the tire against total collapse when deflated. In use, should the tire become deflated, the insert expands to fill or substantially so the internal volume of the tire due to the increase in temperature caused by the increased flexing of the tire and insert. The consequent return to or towards the normal operative tire shape results in the tire subsequently running at or near normal running temperature.

7 Claims, 3 Drawing Figures

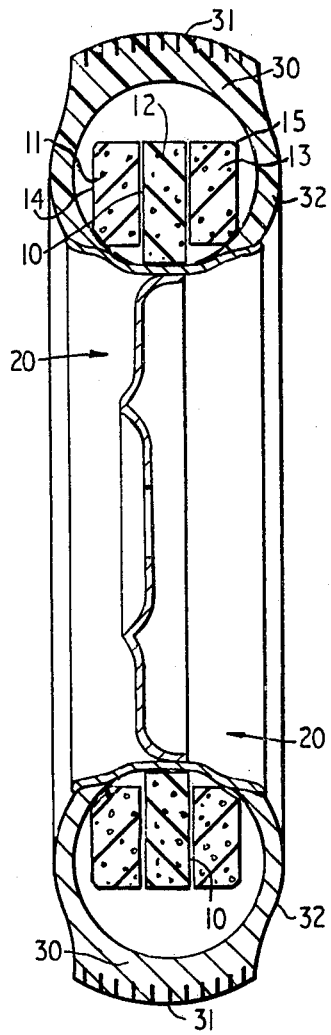
-FIG.1.-
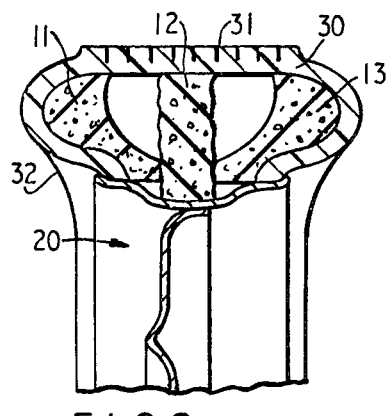
-FIG.2.-
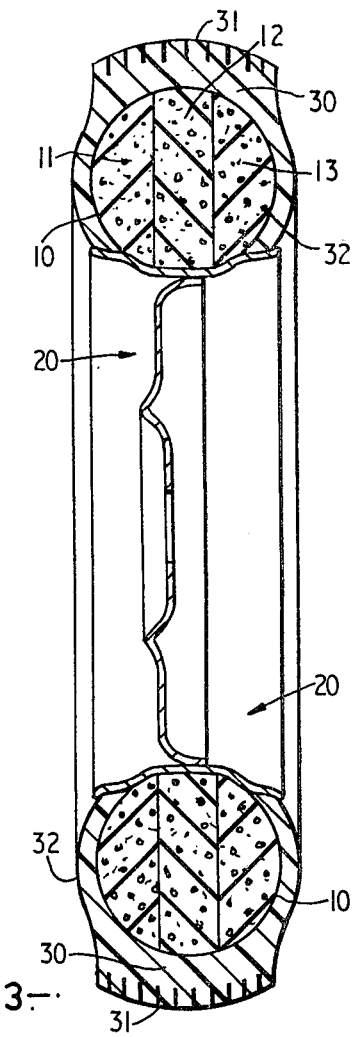
-FIG.3.-

TIRES

This application is a continuation-in-part of my application Ser. No. 966,243 dated Dec. 4, 1978, now abandoned.

This invention relates to so-called "tubeless" tires, for the wheels of road vehicles and aircraft. Tires of this kind require sealing contact with a wheel rim and are directly inflatable by pressure air introduced therein via a valve provided in said rim.

When such tires are punctured, or otherwise become deflated, the tire walls collapse at positions of contact with the ground and the tire will quickly become irremediably damaged if the vehicle continues to be run on them.

It is known to provide a tire with a unitary supporting member of resilient closed cell material or materials designed so as to fit around the rim of a vehicle wheel within a tubeless tire, and of a shape or configuration such that under normal conditions it does not fill the air space of the tire but upon deflation of the tire, becomes heated and expands to fill the tire air space thus supporting the tire. Various rubber and plastics material have been proposed for this purpose with covering membranes and/or complex seatings and retention provisions, and it has also been proposed to make what is also, for practical purposes, a unitary insert from two or more parts joined end to end by interlocking thereof and/or by adhesive or the like.

Unitary tire inserts, however, have a number of disadvantages. They do not adequately protect against damage to tire side walls caused by severe flexing immediately following deflation. Only when the insert has expanded to certain extent do the tire walls, in fact, become supported. If, however, the insert is constructed sufficiently large to support the tire to some extent immediately upon deflation, it is found that under normal running conditions the insert contacts the tire wall on occasion causing damage to both tire and insert.

Furthermore, there is a tendency for large or unitary inserts to disintegrate due to internal stress as caused by differential expansion thereof when heated up by being flexed. This is accentuated for closed cell type tire inserts which are normally heat insulators and the effects of differential expansion will be greater the greater the volume of the insert.

It is an object of this invention to provide a tire insert which is substantially not prone to such problems.

Accordingly this invention provides a pneumatic tire insert of plural separable strip formation each strip comprised at least in part of closed cell resilient material constructed and dimensioned to fit ring-like about a wheel rim within said tire and said insert, in an unexpanded and unpressurised state filling less than the whole interior cross-sectional volume of said tire but supporting said tire against total collapse when deflated, said insert being thermally expandable in subsequent running with said tire deflated due to flexing of the tire and the insert, wherein the insert before expansion has a size and resilience sufficient to support said tire under its normal load to an extent equivalent to or greater than minimum non-damaging inflation.

The strips are preferably wholly separate and side-by-side and particular advantages may be attained if the insert has three strips side-by-side. The outer strips may be shaped to facilitate bending thereof to support the tire wall upon deflation of the tire. Such shaping may merely be chamfering of the outer edges of the outer strips or the outer strips may have a D or crescent cross-section.

The strips are preferably a pinch fit on the wall of the wheel rim to prevent movement and centrifugal distortion, i.e. the strips should have a smaller inside diameter than the diameter of the wheel rim. In this case, the strips will have to be stretched slightly to be fitted to the wheel rim but when in position will grip the wheel rim.

Experiment has shown that a vehicle tire fitted with such an insert or inserts can safely be run for extended periods of time. The reason for this is that when first deflated, as by a puncture or a faulty valve, partial collapse of the tire until it becomes supported by the insert causes flexing and heating of the tire in its continued use. Such flexing and heating of the tire and also flexing of the insert or inserts under load causes heating and therefore expansion of the latter due to its closed cell nature. This increases the tire volume occupied by the insert, preferably to fill or substantially fill the original inflated air space of the tire.

Other advantages and features of this invention will now be further described, by way of example only, with reference to the accompanying drawings in which:

FIG. 1 shows in cross-section an inflated vehicle wheel fitted with a tubeless tire containing an inner support member;

FIG. 2 shows part of the wheel of FIG. 1 after deflation; and

FIG. 3 shows the wheel of FIG. 1 after expansion of the support member.

Referring to the drawings, 10 denotes a resilient support member fitted to the rim of a wheel 20 within a tubeless tire 30 having a tread area 31 and wall 32. The member 10 is in the form of three side-by-side flat strips 11, 12, 13 and is composed, at least in part, of a foamed or expanded, closed cell, rubber or plastics composition. The centre strip 12 may be of different material to the outer strips 11, 13.

As shown in FIG. 1, member 10 normally occupies only part of the air space in the tire 30 and is not then intended to play any part in supporting the load imposed on the tire, which behaves normally whilst inflated to appropriate pressure.

The construction and dimensions of the member 10 relative to the tire 30 are such that under an increase in temperature of the member 10 within a predetermined range, the member 10 will expand to fill, or substantially so, fill the tire air space. Such increase in temperature will occur if for any reason the tire 30 becomes deflated. The member 10 will then take up a load supporting role and becomes subject to continuous flexing. Such increase in the temperature is believed to be assisted by an increase in flexing of the deflated tire but in the main to be caused by flexing of the insert itself.

Expansion of the member 10 and supporting of the tire 30 is shown in FIGS. 2 and 3. On loss of air from the tire 30 pressure of the tread area 31 on the member 10 causes the outer strips 11, 13 to bend and press against buckling to avoid any tire damage immediately after deflation.

Bending of the outer strips 11, 13 is assisted by chamfering of their outer edges 14, 15 respectively. Alternatively, the outer strips may be shaped in other ways to assist bending, for example they may have a D or crescent cross-section.

Whilst the outer strips 11, 13 are bent away from the centre strip 12, the latter is subject to and supports the weight of the vehicle. For this reason, the centre strip 12 may be constructed of a stronger material than that of the outer strip 11, 13.

Although the strips are shown as separate, they may, in fact, be joined at one or more positions, such as the top and bottom, provided air can get between the strips and prevent formation of low pressure areas which could hold the strips together when the tire deflates. An advantage of having the strips joined at one or more points could be to prevent the outer strips splaying out and contacting the tire wall and causing damage to the tire or the support member.

Following deflation of the tire, flexing of the support member 10 and the tire 20 itself, the member 10 expands to fill the tire air space as shown in FIG. 3.

A particular advantage of multistrip support members is the ease of fitment. The individual strips requiring less effort to force them over the wheel rim than for a large unitary insert. Also, no bending of the strips is necessary and no additional parts or means are required to hold the strips in place.

It has been found in experimental practice that, during an initial period of time subsequent to its deflation, a tire as 30 becomes hotter during continued running, but once the member 10 expands to fill or substantially fill the tire's air space, there is a subsequent significant reduction in the temperature of the tire and it can be safely run for an extended period of time pending its repair or replacement.

It will be appreciated that the precise form and size of any insert will depend upon the particular size and type of tires with which it or they are to be used. However, certain basic design criteria or desiderata can be enunciated herein. Thus, there are minimum inflation pressures for pneumatic tires at which they appear to run without irreparable damage for a substantial time and distance. It is my experience of servicing and repairing tires that pressures as low as 5 to 10 p.s.i. have frequently not produced damage in practice. However, for any make, design and size of tire there will be such a minimum inflation pressure either known to the manufacturer or ascertainable by experiment. It is therefore proposed, herein, that the size and resistance to compression, i.e. density and/or resilience, of the insert preferably should be such that normal loading even of a cold, unrun tire that is deflated will result in tire distortion equivalent that which would occur at the above mentioned minimum level of inflation for a tire without an insert.

I have found that, for very hard working 10 inch cross-ply tires, an insert, as illustrated, construction in the form of three side-by-side flat strips of sorbo rubber has proved to be very satisfactory. This was, in fact, more satisfactory than an unitary insert or bonded unit which had a tendency to "lie down" to one side at least if cornered hard before becoming expanded.

It is emphasized again that optimization of insert form and shape for particular tires is and must remain a matter of detail design and experimentation.

A further factor to be considered is, of course, the actual proportion of the inflated volume of the tire that is occupied by the insert before expansion thereof on running with tire deflation. First and foremost this depends upon the thermal coefficient of expansion of the insert material in relation to the desired final degrees of filling of the tire internal space and compression in the insert when the latter is expanded. In practice, using a suitable grade of expanded, mid density rubber such as that sold in the United Kingdom by Sorbo Industrial Polymers Limited under the type number ES7068 (a closed cell expanded polymer of ethylene propylene diene monomer), it has been found that an unexpanded insert volume of between 75% and 90% of the uninflated tire interior produces very good results, for example over 100 miles of running after deflation, with a very small tire (10 inch).

There is one other point to be mentioned and that is the desirability of using an insert material such as sorbo rubber that does not form a significant adhesion with the tire inner surface, particularly on expansion. Various surface treatments coatings or linings may well be possible to reduce any such tendencies for other materials, if necessary, and be applied to either or both of the tire inner and the insert exterior. Another possibility is to use at least exteriorly of the insert, a grade of material that eventually disintegrate to powder in use as was found to occur using a denser grade of sorbo rubber.

I claim:

1. A pneumatic tire insert of separate side by side strips each strip comprised at least in part of closed cell resilient material constructed and dimensioned to fit ring-like about and in contact with a wheel rim within said tire and said insert, in an unexpanded and unpressurized state filling 10 to 25% less than the whole interior cross-sectional volume of said tire but supporting said tire against total collapse when deflated, said insert being thermally expandable in subsequent running with said tire deflated due to flexing of the tire and the insert, wherein the insert before expansion has a size and resilience sufficient to support said tire under its normal load to an extent equivalent to or greater than minimum non-damaging inflation.

2. A pneumatic tire insert comprising plural separable strips in side by side relation, each strip comprised at least in part of closed cell resilient material constructed and dimensioned to fit ring-like about and in contact with a wheel rim within said tire, said insert, in an unexpanded and unpressurized state filling 10 to 25% less than the whole interior cross-sectional volume of said tire but supporting said tire against total collapse when deflated, said insert being thermally expandable in subsequent running with said tire deflated due to flexing of the tire and the insert, wherein the insert before expansion has a size and resilience sufficient to support said tire under its normal load to an extent equivalent to or greater than minimum nondamaging inflation.

3. A pneumatic tire insert as claimed in claim 2 having three strips.

4. A pneumatic tire insert as claimed in claim 3 wherein outer of the three strips have a D-shaped cross-section.

5. A pneumatic tire insert as claimed in claim 3 wherein outer of the three strips have a crescent-shaped cross-section.

6. A pneumatic tire insert as claimed in claim 3 wherein outer edges of outer of the three strips are chamfered.

7. A pneumatic tire insert as claimed in claim 2 wherein the strips have an inner diameter less than that of the wheel rim.

* * * * *